United States Patent [19]
Franzke

[11] Patent Number: 5,156,444
[45] Date of Patent: Oct. 20, 1992

[54] ARRANGEMENT FOR MONITORING THE PERFORMANCE OF A VEHICLE STOP-LIGHT SWITCH

[75] Inventor: Knut Franzke, Schwieberdingen, Fed. Rep. of Germany

[73] Assignee: Robert Bosch GmbH, Stuttgart, Fed. Rep. of Germany

[21] Appl. No.: 466,329
[22] PCT Filed: Oct. 5, 1988
[86] PCT No.: PCT/EP88/00891
§ 371 Date: Jul. 18, 1990
§ 102(e) Date: Jul. 18, 1990
[87] PCT Pub. No.: WO89/04268
PCT Pub. Date: May 18, 1989

[30] Foreign Application Priority Data
Nov. 6, 1987 [DE] Fed. Rep. of Germany ...... 3737688

[51] Int. Cl.$^5$ .................. B60Q 11/00; B60T 8/32
[52] U.S. Cl. ........................ 303/92; 303/20; 303/106
[58] Field of Search .......... 340/453, 458; 303/2 D, 303/92, 91, 93, 108, 110, 113, 113 R

[56] References Cited

U.S. PATENT DOCUMENTS

| | | | |
|---|---|---|---|
| 3,516,058 | 6/1970 | Sanchez et al. | 340/453 |
| 3,874,743 | 4/1975 | Fleischer et al. | 303/92 |
| 3,964,017 | 6/1976 | Arai et al. | 303/92 |
| 4,005,909 | 2/1977 | Jones | 303/91 |
| 4,060,285 | 11/1977 | Jones | 303/106 |
| 4,082,370 | 4/1978 | Leiber et al. | 303/92 |

FOREIGN PATENT DOCUMENTS
2331484 1/1974 Fed. Rep. of Germany.

*Primary Examiner*—Matthew C. Graham
*Attorney, Agent, or Firm*—Felfe & Lynch

[57] ABSTRACT

Two circuits monitor the proper functioning of the stop light switch of a vehicle. When the ignition is actuated, two memories record whether or not the stop light switch releases a signal. The one memory which records whether a stop light switch signal was present is subsequently reset when the stop light switch signal disappears. The second memory is reset when a stop light switch signal occurs. If one of the memories is not reset during travel, a fault message is released when the ignition is actuated again.

6 Claims, 1 Drawing Sheet

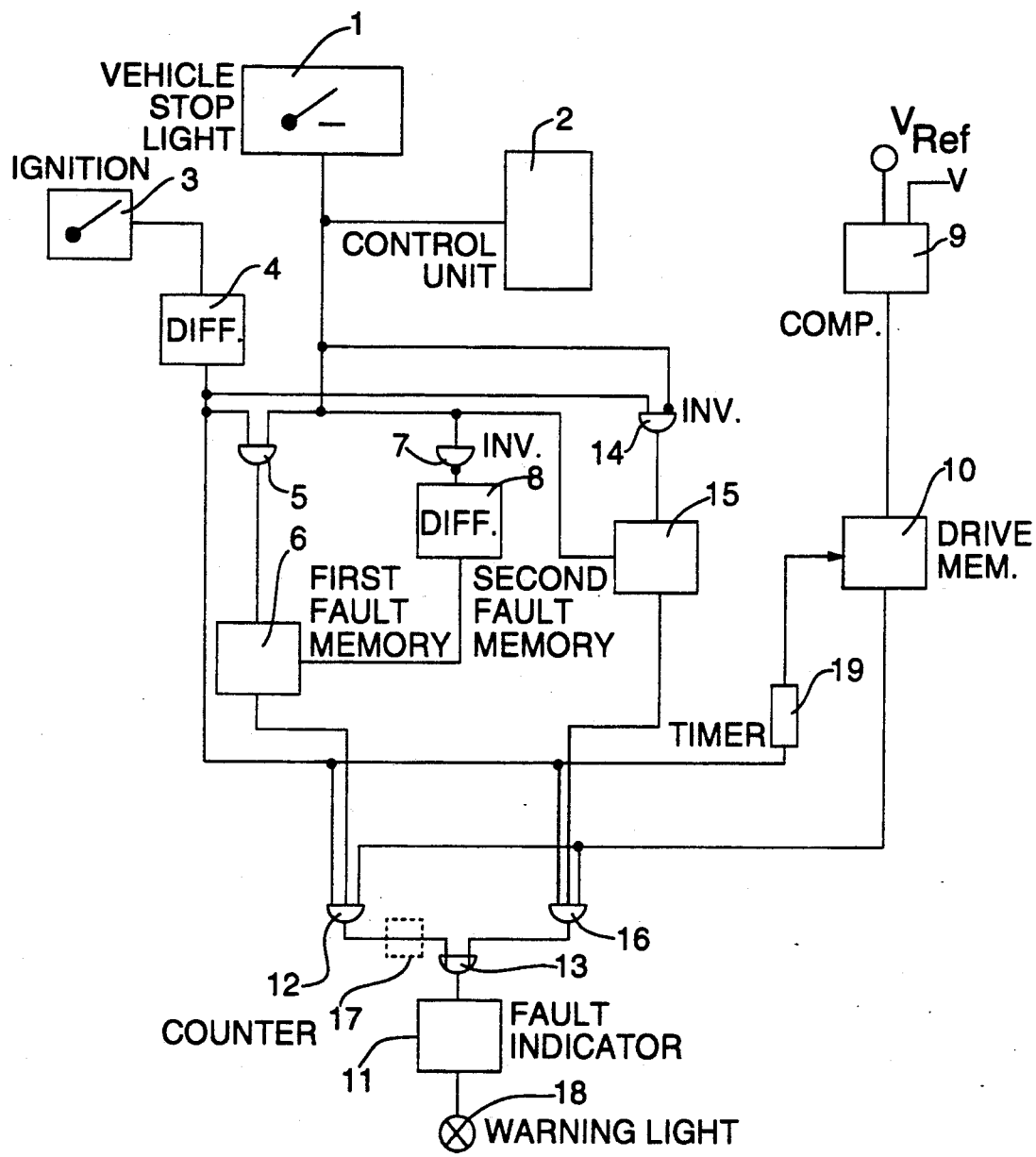

ARRANGEMENT FOR MONITORING THE PERFORMANCE OF A VEHICLE STOP-LIGHT SWITCH

BACKGROUND OF THE INVENTION

Stop light switches are actuated when operating the brake whereupon a signal is released which activates the stop light. In the presence of an anti-lock brake control and/or drive-slip control, however, this signal is also supplied to the control unit of the controller where it is used during control. The presence of this signal can thus serve to activate an ABS-control or interrupt an ASR-control.

Including this signal therefore in the control is of particular interest in order to determine whether the stop light switch is functioning or disabled due to short circuit or line damage.

SUMMARY OF THE INVENTION

Monitoring the stop light switch according to the invention ensures that short circuits as well as line damages are detected and indicated. This can be done by turning on a warning light and/or setting a fault memory such that even when the fault disappears, its occurrence is recorded.

The stop light switch signal is monitored by two circuits. In both circuits the presence of a stop light switch signal is checked when the ignition is actuated.

When the stop light switch signal is present, a first fault memory is set, which memory is cleared when the signal disappears. When a prescribed vehicle speed is exceeded, a drive signal memory is set. A fault indicator is activated if the first fault memory and the drive signal memory are both set when the ignition is subsequently actuated.

When the stop light switch signal is not present, a second fault memory 15 is set, which memory is cleared when the stop light switch signal occurs. When a prescribed vehicle speed is exceeded, a drive signal memory is set. A fault indicator is activated if the second fault memory and the drive signal memory are both set when the ignition is subsequently actuated. Preferably, both monitoring performances are applied parallel. The signal line leading to the control unit is hereby included in the monitoring. The circuits are preferably integrated in the control unit and memories of the control unit are used. When a monitoring of this kind is employed it is also possible to include the stop light switch signal in the control to a larger extent.

In vehicles having an automatic gear shift where the operator's foot remains in most cases on the brake pedal when the vehicle is started, it is advantageous to provide an occurrence switch to set the fault signal only after a prescribed number (e.g. 3) of fault detections.

BRIEF DESCRIPTION OF THE DRAWING

The sole figure is a schematic of the system for monitoring the stop light switch.

DETAILED DESCRIPTION OF THE PREFERRED EMBODIMENT

As shown in the figure, a stop light switch 1 is connected to a control unit 2 via a signal line. The control unit 2 may be part of an anti-lock brake control, a drive slip control, and/or an engine drag torque control which evaluates the stop light switch signal as an auxiliary value.

The actuation of the ignition switch 3 when starting generates a signal that is differentiated in a differentiator 4. The generated pulse temporarily closes an AND-gate 5 when a signal from the stop light switch 1 is available. This is only the case when the operator actuates the brake pedal or when there is a short circuit against the battery potential or when the stop light switch sticks.

The output signal of the AND-gate 5 sets a first non-volatile fault memory 6. If the stop light switch 1 does not supply a signal in case the pulse occurs at the output of differentiator 4, which is the case when the brake is not operated and also when the line is damaged, a second non-volatile fault memory 15 is set in the same way via an AND-gate 14 with inverted input.

If the signal of the stop light switch 1 drops out during subsequent driving, an invertor 7 and a differentiator 8 generate a pulse which resets memory 6. Reversely, memory 15 is also reset when a stop light switch signal occurs because of braking after the setting of the fault memory 15.

A comparator 9 is additionally provided which compares the vehicle speed $V_{ref}$ or the reference speed necessary for measuring the slippage in the control to a preset speed value. If this speed value is surpassed, a non-volatile memory 10 is set which indicates a driving of the vehicle.

If one of the fault memories 6 or 15 was set and has not been reset during driving, but the driving memory 10 was set, a fault indicator 11 will be set via one of the AND-gates 12 and 16 and the OR-gate 13 when the ignition switch is operated again. This fault indicator is here configured as a memory so that a signal which was supplied remains stored at one of the AND-gates 12 and 16. The output signal of this memory can actuate a warning light 18. With a slight delay, memory 10 is deleted via a timer 19 by a signal from the ignition switch 3.

If the vehicle in consideration has automatic gearshift, it is logic to release the fault message only after the fault memory 6 has been set several times. For this purpose, a counter 17 is connected to the output of AND-gate 12 which activates the fault indicator 11 only after the memory 6 has been set three times.

I claim:

1. System for monitoring the performance of at least one of a stop light switch and a signal line between the stop light switch and a control unit which receives the stop light switch signal as an auxiliary input in a vehicle having brakes, said system comprising
   a stop light switch which generates a stop light switch signal when the brakes are operated,
   means for determining whether or not said stop light switch signal is present,
   an ignition switch,
   a first fault memory,
   means for setting said first fault memory when said ignition switch is actuated and a stop light switch signal is present,
   means for clearing said first fault memory when said stop light switch signal disappears,
   a drive signal memory,
   means for setting said drive signal memory when a prescribed vehicle speed is exceeded,
   a fault indicator, and
   means for activating said fault indicator when said first fault memory and said drive signal memory are set and said ignition switch is subsequently actuated.

2. System as in claim 1 further comprising
a second fault memory,
means for clearing said second fault memory when said stop light switch signal is not present and the ignition switch is actuated,
means for clearing said second fault memory when said stop light switch signal occurs, and
means for activating said fault indicator when said second fault memory and said drive signal memory are set and said ignition is subsequently actuated.

3. System as in claim 1 wherein said system is integrated in said control unit.

4. System as in claim 1 further comprising
means for counting the times said first fault indicator has been set, said fault indicator being activated only when said first fault memory has been set a predetermined number of times.

5. System for monitoring the performance of at least one of a stop light switch and a signal line between the stop light switch and a control unit which receives the stop light switch signal as an auxiliary input in a vehicle having brakes, said system comprising
a stop light switch which generates a stop light switch signal when the brakes are operated,
means for determining whether or not said stop light switch signal is present,
an ignition switch,
a second fault memory,
means for setting said second fault memory when said stop light switch signal is not present and the ignition switch is actuated,
means for clearing said second fault memory when said stop light switch signal occurs,
a drive signal memory,
means for setting said drive signal memory when a prescribed vehicle speed is exceeded,
a fault indicator, and
means for activating said fault indicator when said second fault memory and said drive signal memory are set and said ignition is subsequently actuated.

6. System for monitoring the performance of a stop light switch and a signal line between the stop light switch and a control unit which receives the stop light switch signal as an auxiliary input in a vehicle having brakes, said system comprising
a stop light switch which generates a stop light switch signal when the brakes are operated,
a control unit which receives said stop light switch signal as an auxiliary signal,
a signal line connecting said switch to said control signal,
means for determining whether or not said stop light switch signal is present,
an ignition switch,
a first fault memory,
means for setting said first fault memory when said ignition switch is actuated and a stop light switch signal is present,
means for clearing said first fault memory when said stop light switch signal disappears,
a drive signal memory,
means for setting said drive signal memory when a prescribed vehicle speed is exceeded,
a fault indicator, and
means for activating said fault indicator when said first fault memory and said drive signal memory are set and said ignition switch is subsequently actuated.

* * * * *